S. OTIS.
CHOCK FOR RAILWAY CARS.
APPLICATION FILED JUNE 24, 1907.
904,218.
Patented Nov. 17, 1908.
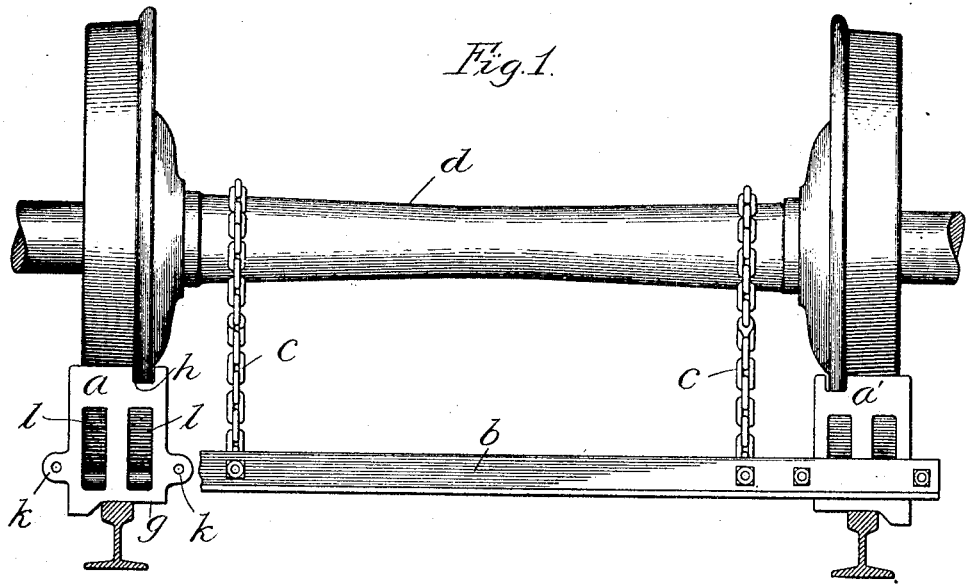
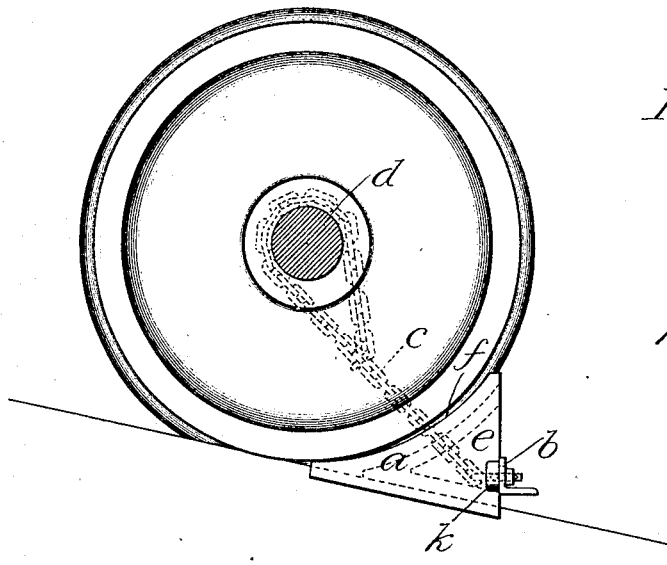
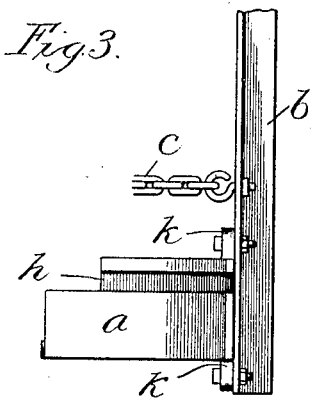
Witnesses:
John Enders
Chas. H. Buell.
Inventor:
Spencer Otis,
By Sheridan & Wilkinson

UNITED STATES PATENT OFFICE.

SPENCER OTIS, OF CHICAGO, ILLINOIS, ASSIGNOR TO GRAVITY COAL BIN COMPANY, A CORPORATION OF MAINE.

CHOCK FOR RAILWAY-CARS.

No. 904,218.     Specification of Letters Patent.     Patented Nov. 17, 1908.

Application filed June 24, 1907. Serial No. 380,496.

*To all whom it may concern:*

Be it known that I, SPENCER OTIS, a citizen of the United States, residing at Chicago, in the county of Cook and State of Illinois, have invented certain new and useful Improvements in Chocks for Railway-Cars, of which the following is a specification.

The object of my invention is to provide a new and improved device for holding railway cars against movement when upon an inclined track.

In the drawing—Figure 1 is a view of my invention, together with a pair of wheels to which it is applied. Fig. 2 is a view, partly in section, of the structure shown in Fig. 1. Fig. 3 is a detail view of one of the chocks and part of the transverse beam to which it is secured.

In the embodiment of my invention illustrated in the drawing, I have shown the chocks *a*, *a'* secured to the ends of a transverse beam *b*. The beam, together with the chocks, may be suspended from any convenient part of the car. In the present instance I have shown the beams suspended by chains *c*, which are looped about the axle *d*.

The chocks consist of metal blocks *e* approximately triangular in shape. The upper surface of each of the chocks is curved, as shown at *f*, to conform to the periphery of the wheel and is also grooved as indicated at *h* to receive the flange of the wheel. The lower surface *g* of the chock is disposed at such an angle to the upper surface that the chock will fit snugly into the angular space between the wheel and the track. Upon either side the chock is provided with perforated ears *k*. Bolts passing through these perforations and corresponding perforations in the beam *b* serve to secure the chocks in place. In order to lighten the structure I have shown the chocks as being formed with cavities *l*. The transverse beam preferably takes the form of an angle iron as illustrated.

As shown in Fig. 2 of the drawings, the curved upper surface of the chock approximates closely at all points to the tread of the wheel when the straight lower surface of the chock rests upon the rail. It is old in the prior art to make chocks with a wedging action and even with a curved upper surface, but it is original with me to make them so that the tread surface of the wheel will rest upon the curved upper surface of the chock over an extended surface at one time. The advantage of this is that it prevents the wheel from being lifted off the rail. It will readily be seen that if the chock had more nearly the form of a thin wedge, the wheel might ride upon it, thus lifting the wheel flange above the rail, in which case a lateral displacement would derail the car.

What I claim is:

1. In a car, a chock consisting of a block of metal having one side curved to fit the periphery of the wheel over an extended surface and another side disposed at such an angle to the first-mentioned side that the block will at the same time conform to the angular space between the wheel and the track.

2. In a car, a transverse beam, chains for suspending the same from the car, and chocks secured to the ends of said beam and adapted to bear upon the wheels and track.

3. In a car, a transverse beam, chains for suspending the same from the car, and chocks secured to said beam adjacent the ends thereof.

4. In a car, a chock having a curved wheel bearing portion and a track bearing portion, the wheel bearing portion being provided with a groove to conform to the flange of the wheel and the track bearing portion being provided with a flange adapted to lie on the outer side of the rail.

5. In a car, a chock having a curved wheel bearing portion and a track bearing portion, the wheel bearing portion being provided with a groove to conform to the flange of the wheel and the track bearing portion being provided with a flange adapted to lie on the outer side of the rail, perforated ears upon said chock, and a transverse beam to which said chock is secured by bolts passing through said ears.

6. In a car, a transverse beam, chocks at the ends of said beam, and chains suspending the same from the axle, said chocks having surfaces conforming to the wheels and track.

SPENCER OTIS.

Witnesses:
    EDYTHE M. ANDERSON,
    W. T. JONES.